(12) United States Patent
Usami

(10) Patent No.: US 8,925,362 B2
(45) Date of Patent: Jan. 6, 2015

(54) METHOD OF MANUFACTURING ROTOR CORE OF ELECTRIC ROTATING MACHINE

(75) Inventor: Hiroaki Usami, Nagoya (JP)

(73) Assignee: Denso Corporation, Kariya (JP)

( * ) Notice: Subject to any disclaimer, the term of this patent is extended or adjusted under 35 U.S.C. 154(b) by 305 days.

(21) Appl. No.: 13/429,905

(22) Filed: Mar. 26, 2012

(65) Prior Publication Data
US 2012/0240389 A1 Sep. 27, 2012

(30) Foreign Application Priority Data
Mar. 25, 2011 (JP) ................................ 2011-067024

(51) Int. Cl.
*B21D 28/32* (2006.01)
*B21D 22/00* (2006.01)
*H02K 15/02* (2006.01)
*B21J 5/02* (2006.01)
*B21K 3/00* (2006.01)

(52) U.S. Cl.
CPC ................ *H02K 15/022* (2013.01); *B21J 5/02* (2013.01); *B21J 5/022* (2013.01); *B21K 3/00* (2013.01)
USPC ..................... 72/356; 72/333; 72/340; 29/598

(58) Field of Classification Search
USPC ........ 72/326, 327, 333, 334, 355.4, 356, 357, 72/360; 29/596, 598
See application file for complete search history.

(56) References Cited

U.S. PATENT DOCUMENTS

| | | | |
|---|---|---|---|
| 5,016,340 A * | 5/1991 | Kato | ................................ 29/598 |
| 5,429,687 A | 7/1995 | Goffart | |
| 5,816,093 A | 10/1998 | Takeuchi et al. | |
| 2002/0138968 A1 | 10/2002 | Kato et al. | |

FOREIGN PATENT DOCUMENTS

| | | |
|---|---|---|
| JP | A-54-109102 | 8/1979 |
| JP | A-8-511154 | 11/1996 |
| JP | B2-2935817 | 8/1999 |
| JP | A-2002-291208 | 10/2002 |
| JP | B2-3609745 | 1/2005 |

OTHER PUBLICATIONS

Japanese Office Action issued in Japanese Application No. 2011-067024 dated Dec. 20, 2012 (w/translation).

* cited by examiner

*Primary Examiner* — Debra Sullivan
(74) *Attorney, Agent, or Firm* — Oliff PLC

(57) ABSTRACT

The method is for manufacturing a rotor core having a cylindrical boss section formed with an axial hole, a disc section radially extending from one end of the boss section, and a plurality of claw sections provided along an outer periphery of the disc section. A boss section-side hole as a part of the axial hole is formed by plastic deformation in a preliminary shaping step. The remaining part of the axial hole of the billet disposed on a die is punched through using a center hole punch having a diameter smaller than an inner diameter of the boss section-side hole to form the disk section-side hole in the flush/punch through step, so that the axial hole is constituted of the boss section-side hole, the disk section-side hole and a step portion between the boss section-side hole and the disk section-side hole.

2 Claims, 8 Drawing Sheets

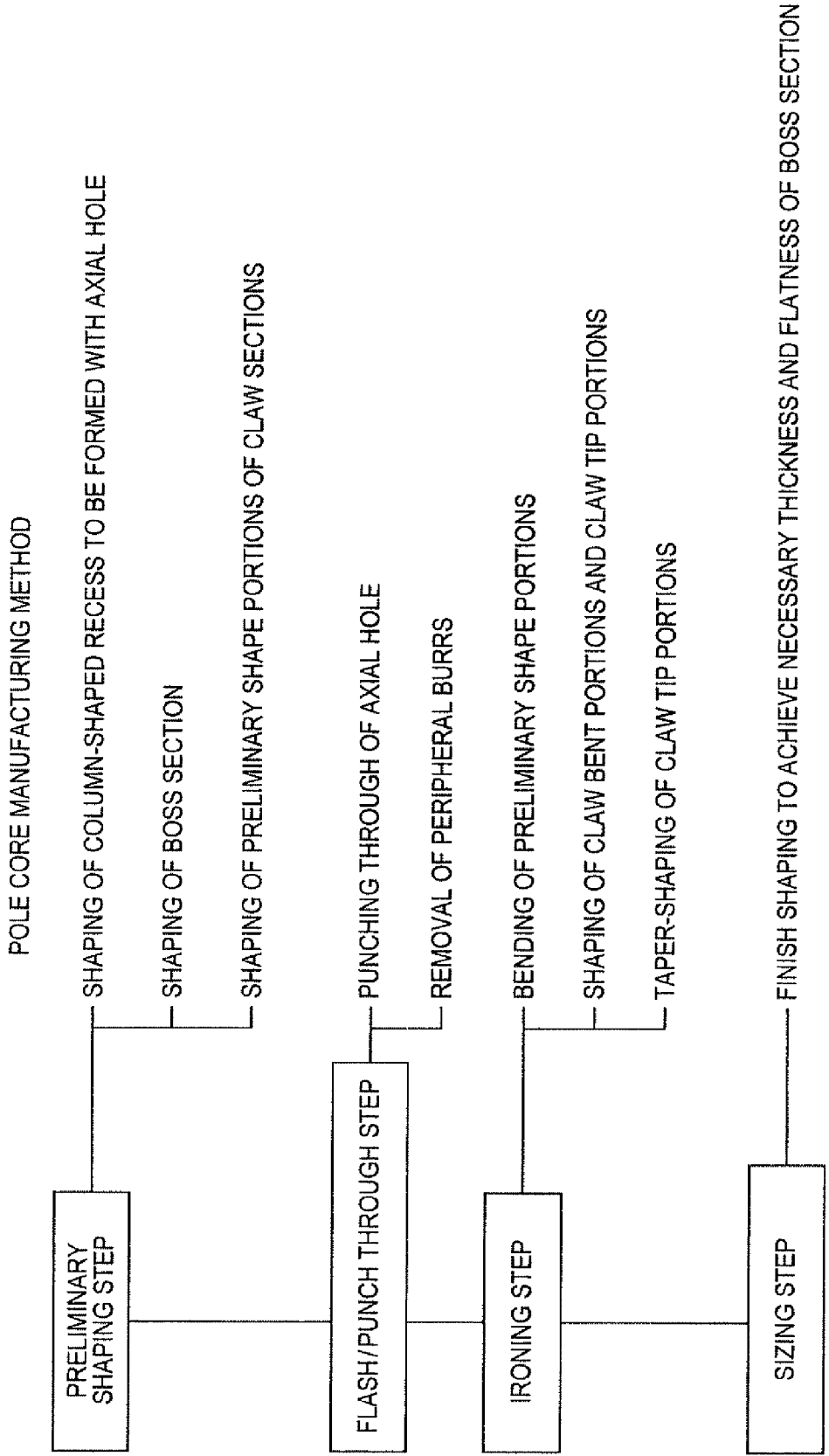

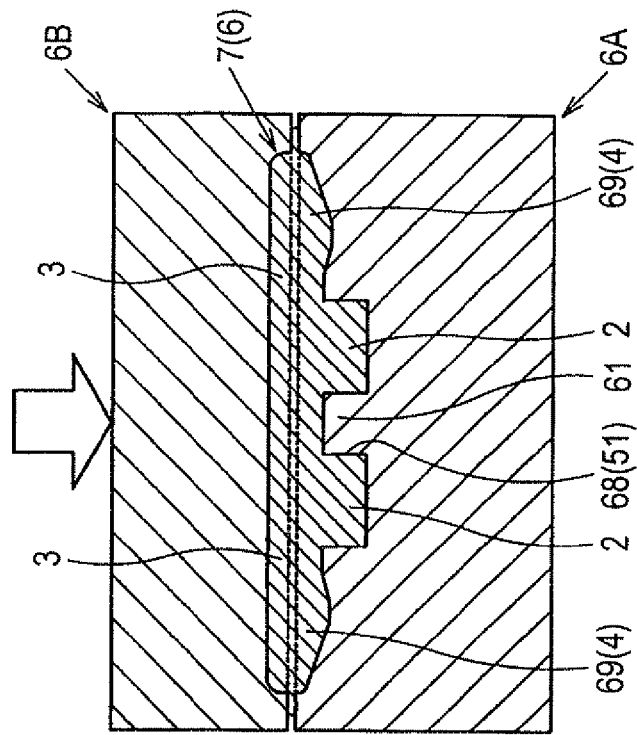

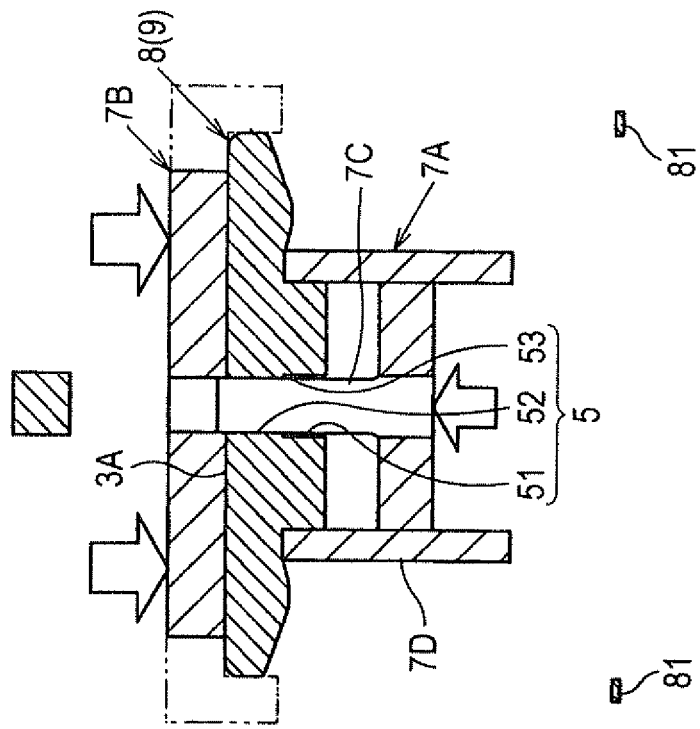
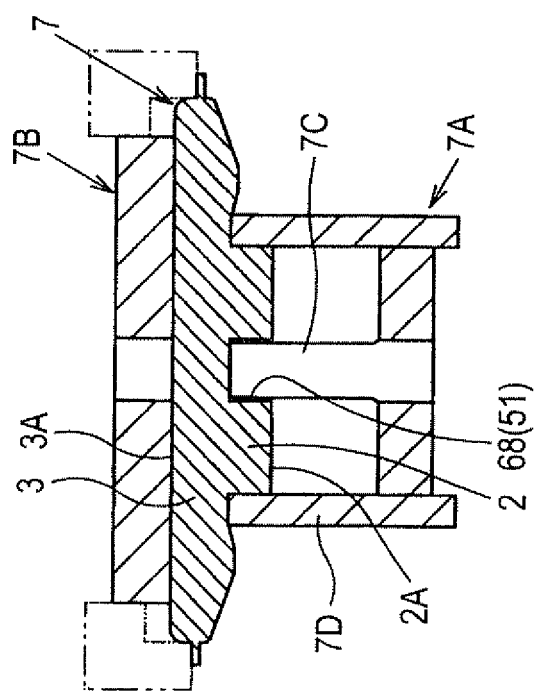
FIG. 4A
FIG. 4B

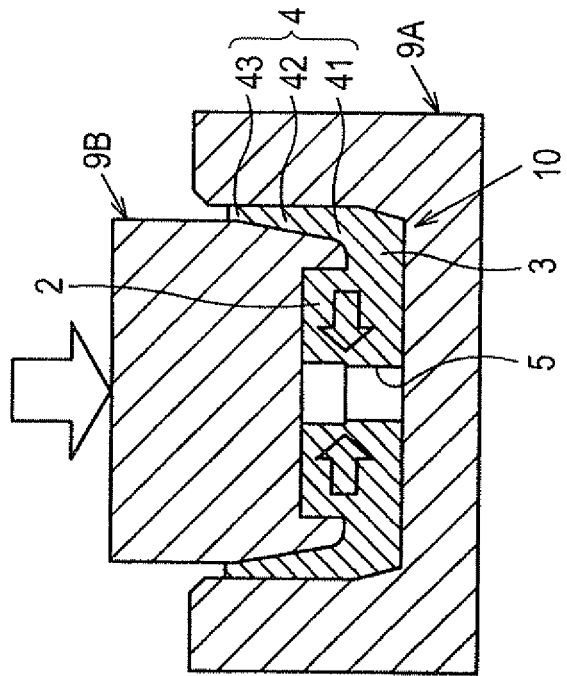
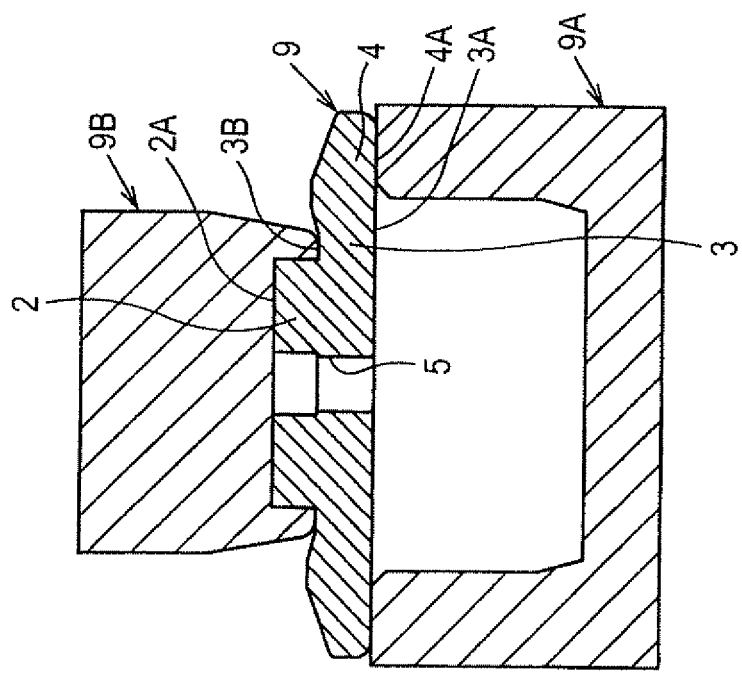

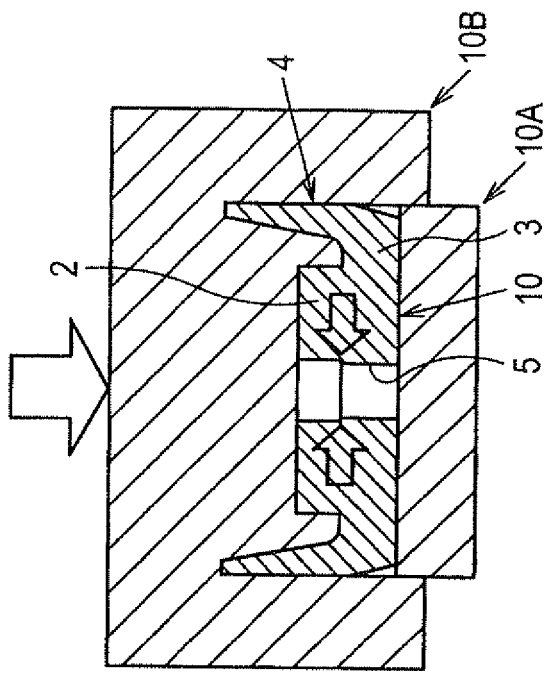
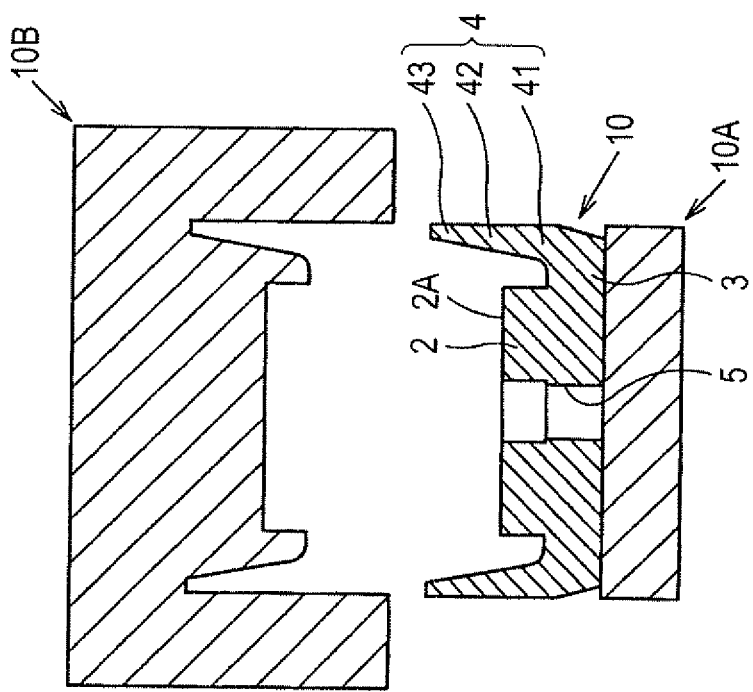

METHOD OF MANUFACTURING ROTOR CORE OF ELECTRIC ROTATING MACHINE

This application claims priority to Japanese Patent Application No. 2011-067024 filed on Mar. 25, 2011, the entire contents of which are hereby incorporated by reference.

BACKGROUND OF THE INVENTION

1. Field of the Invention

The present disclosure relates to a method of manufacturing a rotor core (pole core) having a plurality of claws of an electric rotating machine.

2. Description of Related Art

It is known to use, as a rotor of an electric rotating machine such as a vehicle-use alternator, a pair of pole cores each having a cylindrical boss section formed with an axial hole thereinside, a disk section radially extending from one end of the boss section, and a plurality of claw sections axially extending from the periphery of the disk section at equal intervals toward the other end of the disk section. Each adjacent two of the claw sections form a V-shaped channel reaching the outer periphery of the disk section.

The pair of the pole cores are disposed opposite to each other such that the claw sections of one pole core are located in the V-shaped channels of the other pole core with a certain clearance therebetween. A field coil is disposed between the outer periphery of the disk sections and the inner periphery of the claw sections, and a shaft is pressure-inserted into the axial hole to constitute a Lundell-type rotor core.

Such a pole core is manufactured by cold forging or hot forging in view of productivity, as shown, for example, in Japanese Patent No. 3609745. This patent document describes a method of manufacturing a pole core as shown in FIG. 7, in which a boss section 2a is placed downward, an axial hole 2b is punched through the boss section 2a using a punch p of an upper mold m3a and a center die d of a lower mold m3b, and simultaneously with this, claw sections 4a are ironed to stretch while being bent until they form an angle of 90 degrees with a disk section 3a so that step portions 4a1 of the claw sections 4a are pressed against step portions f2 of the lower mold m3b, and shaped into step portions 4b.

In this method, the axial hole 2b is formed in one pressing step using the punch p. Accordingly, since an amount of slide movement is large, the shaping accuracy may be lowered depending on the accuracy of slide movement. Further, since a pressing load is large, a large apparatus is necessary to manufacture the pole cores, and accordingly the productivity is low. Further, since the boring punch p is a part of the upper mold while the punch for shaping the boss section is a part of the lower mold, displacement between the centers of the upper and lower molds is likely to increase, causing displacement between the center of the boss section and the center of the axial hole to increase.

Japanese Patent No. 2935817 describes a stepped-hole forming method as shown in FIG. 8, in which an item to be shaped is formed with a through hole H1 with an inverse-tapered portion using a shaping punch having a smaller diameter portion, a tapered portion and a larger diameter portion, and then formed with a stepped hole H2 having a tapered shape by pressing work.

According to this stepped-hole forming method, to form the stepped hole H2 having a larger diameter using the shaping punch p1, the through hole H1 having a smaller diameter is formed at first. Accordingly, in this method, excess metal Y easily flows into the smaller diameter portion and the hole edge by a large amount during pressing work. Since such excess metal Y interferes with a shaft inserted into the axial hole or a bearing collar at the time of assembling the pole cores, the resistance load of pressure-insertion of the shaft increases, and the fitting strength of a bearing is lowered.

SUMMARY

An exemplary embodiment provides a method of manufacturing a rotor core having a cylindrical boss section formed with an axial hole extending in an axial direction, a disc section radially extending from one end of the boss section, and a plurality of claw sections provided at equal intervals along an outer periphery of the disk section so as to extend in the axial direction toward the other end of the boss section, comprising:

a preliminary shaping step of shaping a billet to have a part of the axial hole on the side of the boss section as a boss section-side hole, the boss section, and preliminary shape portions of the claw sections;

a flush/punch through step of ejecting burrs occurred during the preliminary shaping step and shaping a remaining part of the axial hole on the side of the disk section as a disk section-side hole;

an ironing step of bending the preliminary shape portions of the claw sections to form claw bent portions and claw tip portions, and taper-shaping the claw tip portions; and a sizing step of performing finish shaping to achieve necessary thickness and flatness of the boss section, wherein, the billet is formed with the boss section-side hole by plastic deformation in the preliminary shaping step, and the remaining part of the axial hole of the billet disposed on a die is punched through using a center hole punch having a diameter smaller than an inner diameter of the boss section-side hole to form the disk section-side hole in the flush/punch through step, so that the axial hole is constituted of the boss section-side hole, the disk section-side hole and a step portion between the boss section-side hole and the disk section-side hole.

According to the exemplary embodiment, there is provided a method of manufacturing a rotor core of an electric rotating machine, capable of reducing a resistance load of pressure insertion of a shaft to the axial hole of the boss section of the rotor core, maintaining necessary fitting strength between the rotor core and the shaft.

Other advantages and features of the invention will become apparent from the following description including the drawings and claims.

BRIEF DESCRIPTION OF THE DRAWINGS

In the accompanying drawings:

FIG. 2 is a flowchart showing steps of the method of manufacturing a rotor core according to the embodiment;

FIGS. 3A and 3B are diagrams for explaining a preliminary shaping step included in the method of manufacturing a rotor core according to the embodiment;

FIGS. 4A and 4B are diagrams for explaining a flash/punch through step included in the method of manufacturing a rotor core according to the embodiment;

FIGS. 5A and 5B are diagrams for explaining an ironing step included in the method of manufacturing a rotor core according to the embodiment;

FIGS. 6A and 6B are diagrams for explaining a sizing step included in the method of manufacturing a rotor core according to the embodiment;

PREFERRED EMBODIMENTS OF THE INVENTION

Figure 1:
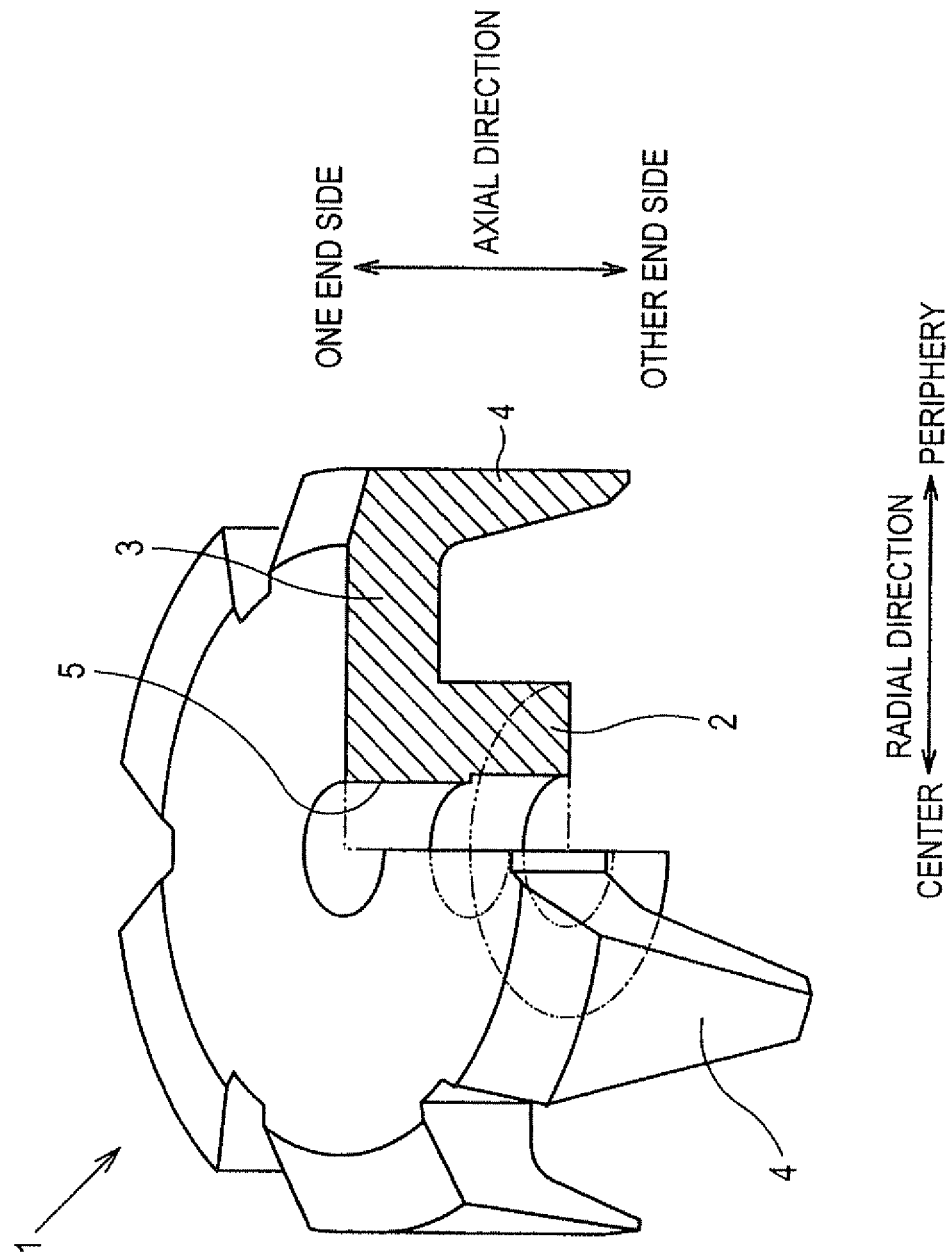
FIG. 1 is a perspective view of a rotor core (pole core) of an electric rotating machine, which is manufactured by a method of manufacturing a rotor core according to an embodiment of the invention.
Figure 7:
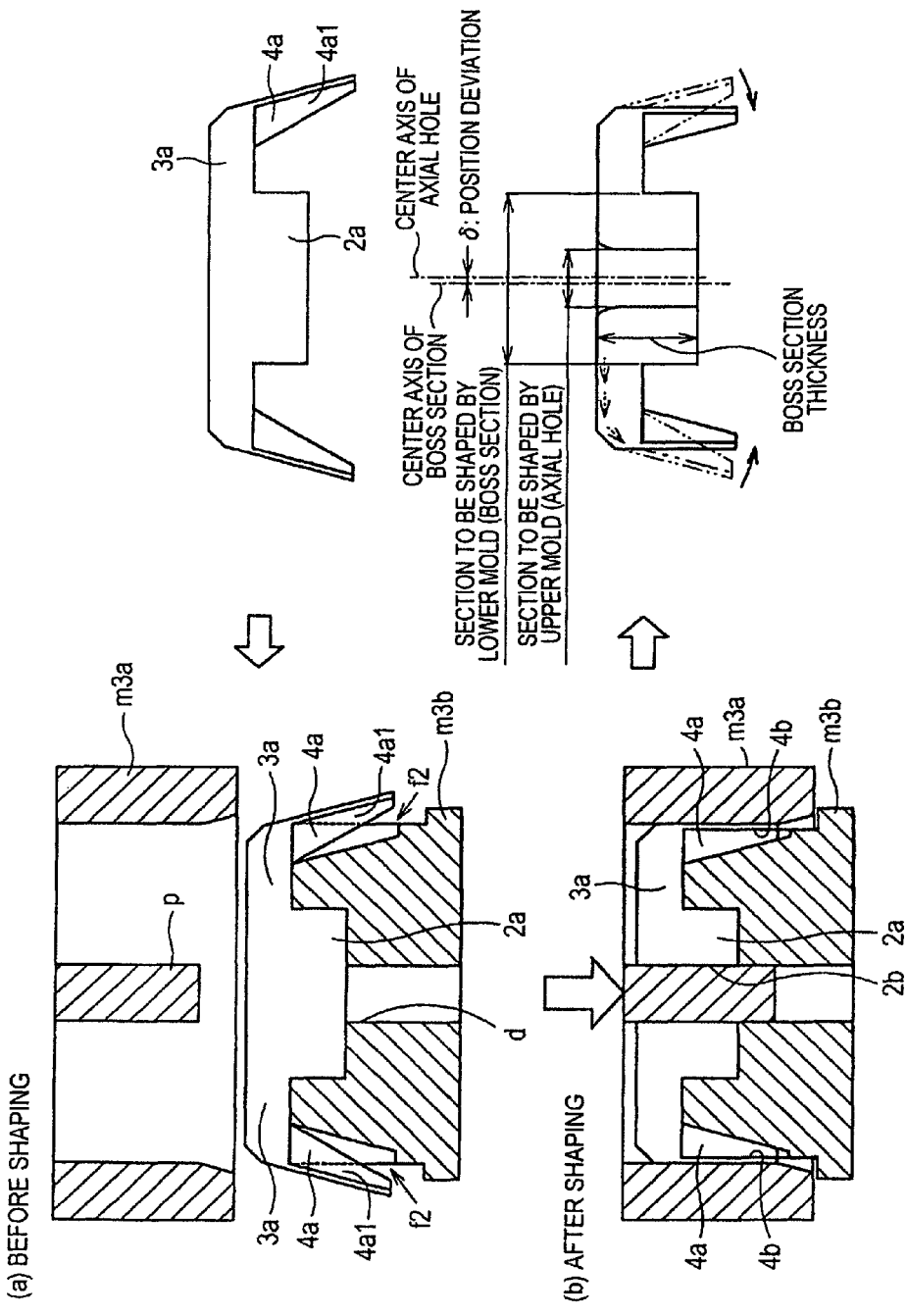
FIG. 7 is a diagram for explaining a conventional flash through step and ironing step.
Figure 8:
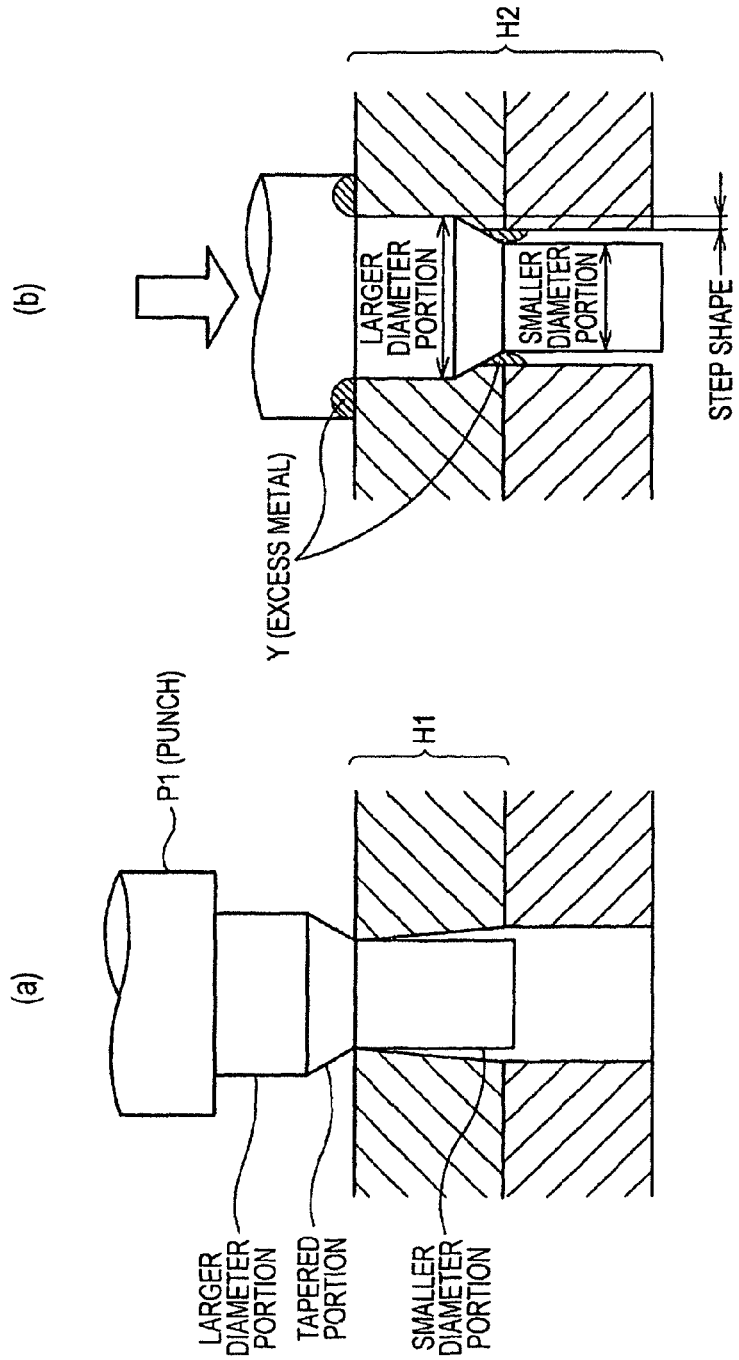
FIG. 8 is a diagram for explaining a conventional stepped hole forming step.

FIG. 1 is a perspective view of a rotor core (referred to as a pole core hereinafter) 1 of an electric rotating machine, which is manufactured by a method of manufacturing a rotor core according to an embodiment of the invention. The pole core 1 includes a cylindrical boss section 2 and a disk section 3 radially extending from one end of the boss section 2. The disk section 3 has a plurality of claw sections 4 axially extending from the periphery of the disk section 3 toward the other end of the boss section 2, each claw section 4 serving as a claw shaped-magnetic pole. A Lundell-type rotor core is formed by assembling two pole cores 1 disposed opposite to each other, a field coil and a shaft.

As shown in FIG. 2, the pole core 1 is manufactured by a method including:

(a) a preliminary shaping step of shaping the cylindrical boss section having a column-shaped recess to be formed with the axial hole at its center, and preliminary shape portions of the claw sections;

(b) a punch through step of forming the axial hole by punching through the bottom of the column-shaped recess, and a flash through step of removing peripheral burrs;

(c) an ironing step of forming claw bent portions and claw tip portions by bending the preliminary shape portions of the claw sections in the axial direction, and taper-shaping the claw tip portions; and (d) a sizing step of performing finish shaping to achieve necessary thickness and flatness of the boss section. In this embodiment, the punch through step and the flash through step are performed at the same time as a flash/punch through step.

Next, the method of manufacturing the pole core 1 is explained with reference to FIGS. 3A and 3B to FIGS. 6A and 6B. In the preliminary shaping step, as shown in FIG. 3A, the disk-shaped billet 6 is disposed on a die 6A formed with an annular groove 62 with a column-shaped projection 61 at its center, an annular dish-shaped recess 63 located along the outer periphery of the groove 62, and recesses 64 located extending radially at equal intervals along the outer periphery of the recess 63. Thereafter, the billet 6 is pressed and forged using a punch 6B formed with a circular recess 66.

As a result, the billet 6 is formed with, at its lower surface, a column-shaped recess 68 (referred to as "boss section-side hole 51" hereinafter) corresponding to the annular groove 62 with the column-shaped projection 61 at its center, and the boss section 2, as shown in FIG. 3B. At this time, also the disk section 3 radially extending from the periphery of the boss section 2 and the preliminary shape portions of the claw sections 4 arranged radially along the outer periphery of the boss section 2 are formed to complete a primary forged item 7.

FIGS. 4A and 4B are diagrams for explaining the flash/punch through step. The lower surface of the primary forged item 7 (referred to as "boss section end surface 2A" hereinafter) is disposed on a lower die 7A having a cylindrical shape, and an upper die 7B is placed on the upper surface of the primary forged item 7 (referred to as "disk section end surface 3A" hereinafter). The lower die 7A includes a positioning guide 7D having an inner diameter appropriate for fitting with the outer periphery of the boss section 2, and is shaped such that its center axis coincides with the center axis of the boss section 2. A center hole punch 7C for punch-through work is slidably fitted to the center axis of the lower die 7A. The center hole punch 7C is shaped such that its center axis coincides with the center axis of the boss section 2.

The primary forged item 7 pressed by the upper die 73 at the disk section end surface 3A is bored with an axial hole 52 by the center punch 7C from the bottom of boss section-side hole 51 (the column-shaped recess 68) to complete a secondary provisional forged item 8. The outer diameter of the center hole punch 7C is smaller than the inner diameter of the boss section-side hole 51. Accordingly, as shown in FIG. 4B, the axial hole 5 has a step portion 53 located at the boundary between the boss section-side hole 51 having a larger diameter and the axial hole 52 having a smaller diameter (referred to as "disk section-side hole 52" hereinafter).

The boring using the center hole punch 7C is performed from the side of the larger hole-diameter side, and accordingly the center hole punch 7C abuts the bottom of the hole having the larger diameter in the beginning of the boring. That is, in this embodiment, since the boss section 2 is bored not for its whole axial length (whole thickness), but for only a short stroke from the bottom of the hole having the larger diameter. Accordingly, since the amount of slide movement of a forging machine used for this method is small, and accordingly the positioning accuracy of the punch is high, deflection of the punched axial hole 5 can be made small.

Further, since the boring is made in the direction from the larger diameter side to the smaller diameter side, sagging occurs in a portion at which the bottom of the larger diameter hole continues to the smaller diameter hole, that is, sagging occurs in the step portion 53 so as to extend to the disk section-side hole 52 in a curved line, burrs are difficult to occur inside the axial hole 5. In addition, since a warped portion due to pressure insertion of the shaft (film-like excess metal heading from the open end of a hole to the axially outside, which occurs during boring of the hole) is difficult to occur, generation of burrs due to deformation of such a warped portion can be prevented. Accordingly, according to this embodiment, burr biting at the time of pressure-insertion of the shaft, and burr scratch of a coil insulator can be prevented.

Further, since both the axis center of the boss section-side hole 51 having the larger diameter and the disk section-side hole 52 having the smaller diameter are aligned with respect to the outer periphery of the boss section 2, the axis centers of the boss section-side hole 51 and the disk section-side hole 52 can be easily aligned with each other. The flash through step (see the phantom line in FIGS. 4A and 4B) for cutting and removing burrs 81 on the outer periphery of the secondary provisional forged item 8 is performed before, after or simultaneously with the punch through step to complete a tertiary provisional forged item 9.

FIGS. 5A and 5B are diagrams for explaining the ironing step. The tertiary provisional forged item 9 is pressed by a die 9A and a punch 9B at the end surface of the boss section 2, and the outer sides of the claw sections 4 continuing to the outer surface of the disk section 3. As a result, after the claw sections 4 are bent such that their outer sides become parallel to the axial direction, the claw bent portions 42 bent in the axial direction from the claw base portions extending radially outward, and the claw tip portions 43 extending in the axial direction are formed. Further, the claw tip portions 43 are taper-shaped so that their thicknesses in the radial direction become smaller toward their ends to complete a quaternary forged item 10.

FIGS. 6A and 6B are diagrams for explaining the sizing step. The quaternary forged item 10 is pressed by a die 10A and 10B at the boss section end surface 2A, and the sides of the claw tip portions 43, claw bent portions 42, claw base portions 41 and disk section 3 in the axial direction, to achieve necessary thickness and flatness of the boss section 2.

In the above embodiment, the inner diameter of the boss section-side hole 51 of the axial hole 5 formed in the preliminary shaping step by forging is made larger than that of the disk section-side hole 52 formed by punching in the punch through step, and the step portion 53 is formed between the boss section-side hole 51 and the disk section-side hole 52. Accordingly, since the fitting strength between the pole core 1 and the shaft can be properly adjusted by adjusting the inner diameters of the boss section-side hole 51 and the disk section-side hole 52, and the position of the step portion 53, it is possible to reduce the resistance load of pressure insertion of the shaft, maintaining the necessary fitting strength. Further, since the axial hole is formed in the two steps (the step of forging the boss section-side hole 51, and the step of punching through the disk section-side hole 52), it is possible to reduce inclination of the axis of the axial hole in the thickness direction of the boss section 2 to increase the coaxially of the center axis of the boss section 2.

The above explained preferred embodiments are exemplary of the invention of the present application which is described solely by the claims appended below. It should be understood that modifications of the preferred embodiments may be made as would occur to one of skill in the art.

What is claimed is:

1. A method of manufacturing a rotor core having a cylindrical boss section formed with an axial hole extending in an axial direction, a disc section radially extending from one end of the boss section, and a plurality of claw sections provided at equal intervals along an outer periphery of the disk section so as to extend in the axial direction toward the other end of the boss section, comprising:
    a preliminary shaping step of shaping a billet to have a part of the axial hole on a side of the boss section as a boss section-side hole, the boss section, and preliminary shape portions of the claw sections, the billet being disposed on a lower mold formed with an annular groove with a column-shaped projection located at a center of the annular groove, and pressed by an upper mold so that the billet is formed with the disk section at an upper surface thereof, and simultaneously formed with the boss section side-hole and the boss section;
    a flush/punch through step of ejecting burrs occurred during the preliminary shaping step and shaping a remaining part of the axial hole on a side of the disk section as a disk section-side hole;
    an ironing step of bending the preliminary shape portions of the claw sections to form claw bent portions and claw tip portions, and taper-shaping the claw tip portions; and
    a sizing step of performing finish shaping to achieve necessary thickness and flatness of the boss section,
    wherein,
    the billet is formed with the boss section-side hole by plastic deformation in the preliminary shaping step, and the remaining part of the axial hole of the billet disposed on a die is punched through using a center hole punch having a diameter smaller than an inner diameter of the boss section-side hole to form the disk section-side hole in the flush/punch through step, so that the axial hole is constituted of the boss section-side hole, the disk section-side hole and a step portion between the boss section-side hole and the disk section-side hole.

2. A method of manufacturing a rotor core having a cylindrical boss section formed with an axial hole extending in an axial direction, a disc section radially extending from one end of the boss section, and a plurality of claw sections provided at equal intervals along an outer periphery of the disk section so as to extend in the axial direction toward the other end of the boss section, comprising:
    a preliminary shaping step of shaping a billet to have a part of the axial hole on a side of the boss section as a boss section-side hole, the boss section, and preliminary shape portions of the claw sections;
    a flush/punch through step of ejecting burrs occurred during the preliminary shaping step and shaping a remaining part of the axial hole on a side of the disk section as a disk section-side hole;
    an ironing step of bending the preliminary shape portions of the claw sections to form claw bent portions and claw tip portions, and taper-shaping the claw tip portions; and
    a sizing step of performing finish shaping to achieve necessary thickness and flatness of the boss section,
    wherein,
    the billet is formed with the boss section-side hole by plastic deformation in the preliminary shaping step, and the remaining part of the axial hole of the billet disposed on a die is punched through using a center hole punch having a diameter smaller than an inner diameter of the boss section-side hole to form the disk section-side hole in the flush/punch through step, so that the axial hole is constituted of the boss section-side hole, the disk section-side hole and a step portion between the boss section-side hole and the disk section-side hole,
    wherein the die used in the flash/punch through step includes a positioning guide for fitting with respect to an outer periphery of the boss section,
    the positioning guide and the center hole punch being joined coaxially with each other,
    the disk section-side hole being bored from a bottom of the boss section-side hole by using the outer periphery of the boss section as a positional reference of the disk section-side hole.

* * * * *